April 12, 1966     C. L. LONG     3,245,334

NONCONTACTING SEALING METHOD AND APPARATUS

Filed Aug. 27, 1962

INVENTOR
CECIL LOUIS LONG

BY *Francis A. Paintin*

ATTORNEY 3,245,334
NONCONTACTING SEALING METHOD AND
APPARATUS
Cecil Louis Long, Westfield, N.J., assignor to E. I. du Pont de Nemours and Company, Wilmington, Del., a corporation of Delaware
Filed Aug. 27, 1962, Ser. No. 219,565
6 Claims. (Cl. 95—89)

This invention relates to a novel means of providing, between two chambers, a seal through which a continuous web may travel. More particularly, it relates to a seal wherein mechanical contact is completely avoided with at least one side of the web as it travels through the seal.

Sealing devices have been known in the art which obtain their sealing action by physical contact with the web. Such devices, while adequate for the handling of many types of webs, are obviously not suitable for the handling of abrasion or scratch susceptible web material. Other devices mentioned in the art avoid physical contact by providing relatively large clearances between the web and the seal member. Where an appreciable pressure differential is desired between chambers, such devices necessitate multiple staging of the seals and also necessitate handling of large gas volumes to maintain adequate pressure differentials. Other devices avoid large clearances by positioning of shoes or shrouds which limit the clearance between opposing seal surfaces. Such devices become relatively complicated because of the mechanism needed to provide precise positioning of the opposing seal surfaces and, even with such limited clearances, there is a possibility of inadvertent contacting of the web with the shoe or shroud, due to web tension variations, etc.

It is, therefore, an object of the present invention to provide a relatively simple sealing means and method whereby a continuous web may travel between two chambers maintained at different ambient conditions wherein at least one side of the web is free of physical contact with the sealing means. It is a further object to provide such sealing means and method for webs which may travel at high rates of speed. A still further object is to provide such a device which is simple and economical to construct, and a method capable of effective operation without requiring the use of large volumes of gas. Other objects will be apparent from the following description of the invention.

Figure 1:
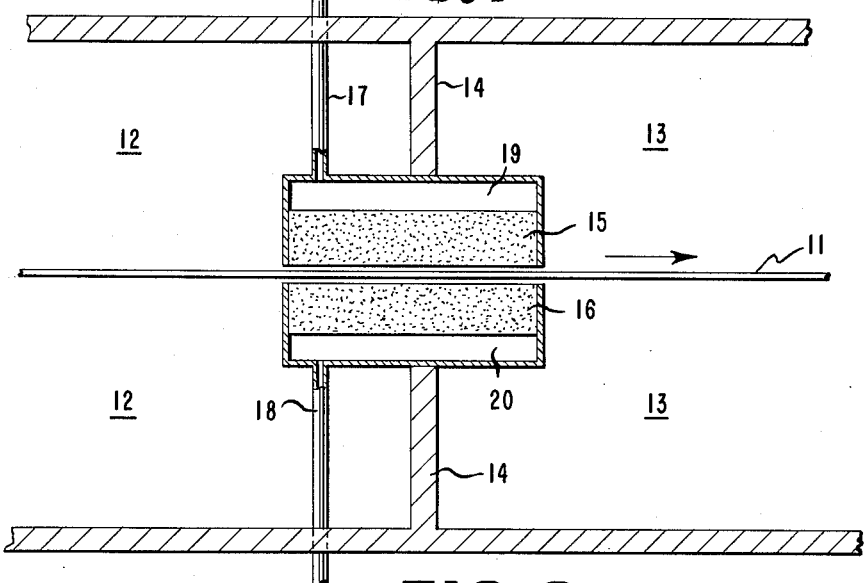
Figure 2:
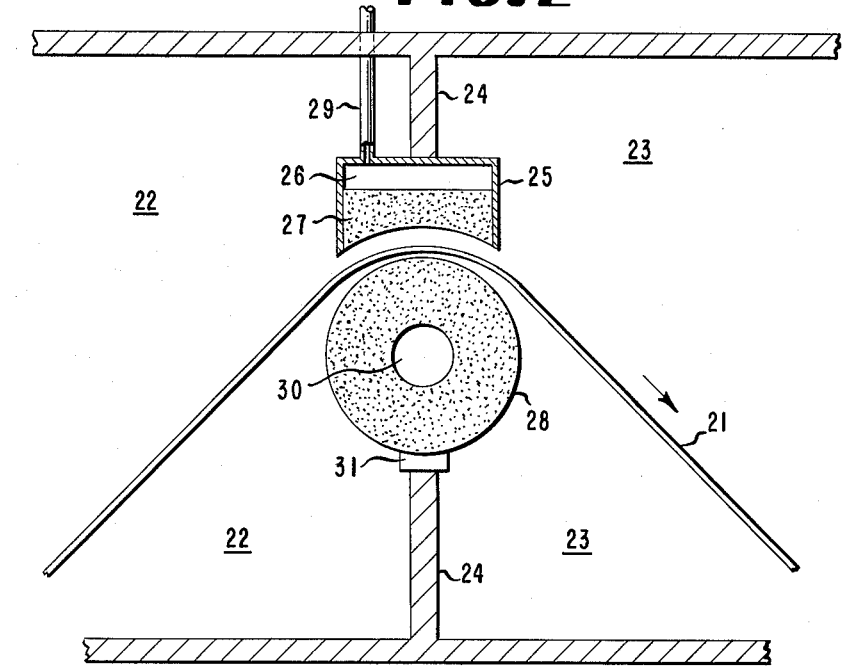

These and other objects are accomplished in accordance with this invention which is particularly pointed out in the appended claims and preferred embodiments of which are illustrated in the accompanying drawings wherein:

FIGURE 1 is a schematic, sectional end view of a preferred embodiment of the invention utilizing two flat porous surfaces in the sealing means, and FIGURE 2 is a schematic, sectional end view showing an alternate embodiment of the invention in which the web travels between curved porous surfaces.

Referring now to FIGURE 1, a web 11 travels, in the direction indicated by the arrow, from chamber 12 to chamber 13, said chambers being maintained at different ambient conditions. The chambers are separated by partition 14 to which are attached elements comprising porous plates 15 and 16 with their respective plenum chambers 19 and 20, positioned in such a manner as to provide a narrow slot for the passage of a moving web between opposing surfaces of the two porous plates 15 and 16; the narrow slot is essentially the only opening between chambers 12 and 13. A gas is fed through supply tubes 17 and 18, into plenum chambers 19 and 20, respectively, under sufficient pressure that, as it passes through each porous plate and escapes along the face of the plate opposite the plenum chamber, it prevents physical contact of the travelling web and the porous plate. Escape of gas is possible at only the opposed surfaces of the porous plates located at either side of the web. The sides and ends of the porous plates are sealed in any convenient manner to prevent escape of gas, e.g., by soldering, mechanical working of the surface to close the pores (e.g., planing, shearing, peening, etc.), application of paint-like sealing compounds, adding plates of gas impermeable material, etc.

In an alternate embodiment of the invention illustrated in FIGURE 2, a web 21 travels in the direction indicated by the arrow from chamber 22 to chamber 23. The chambers are separated by partition 24 connected to concentrically curved porous members 25 and 28. Member 25 comprises a plenum chamber 26 and an arcuately curved porous plate 27. Different ambient conditions may be maintained in the two chambers by forcing a gas through supply tube 29 into plenum chamber 26 and through the porous member 27, and, by supplying a gas through a supply tube (not shown) into plenum chamber 30 within cylindrical porous member 28. Gas is supplied through the supply tubes and through the porous members 27 and 28 under sufficient pressure to prevent physical contact between the web and the adjacent surfaces of the porous members. Only through those opposed surfaces of the porous members on either side of the web is passage of the gas possible. Other surfaces of the porous material are sealed by suitable methods as described earlier. When it is desired that member 28 be stationary, there is no particular reason for it to be circular in cross section as shown in the drawing. A member with a non-circular cross section, e.g., parabolic or arcuate, could be employed in an alternate embodiment.

The embodiment of the invention illustrated in FIGURE 2 can be further modified where it is desirable to handle a web which is relatively non-susceptible to physical damage on one side. In such a situation, better web handling may be possible by using a rotating but non-porous roll for member 28. In this situation, the side of the web less susceptible to damage by physical contact rides over the roller (in direct contact) since there is no gas provided to prevent physical contact. Gas is supplied, however, through porous member 25 as previously described, so that physical contact is avoided between curved porous plate 27 and the relatively more damage-susceptible web surface. In this embodiment of the invention it is desirable to provide a closure 31 between partition 24 and roll 28 to seal chamber 22 from chamber 23 at that point.

The exact configuration of the seal of this invention will, of course, vary with the particular manner in which it is used. It may, for example, be advantageous to make the corners of the porous surface more rounded near the points where the web enters or exits from the seal. Such a modification of the configuration might be required to prevent contact between the web and the porous surface since, at the points of entrance and exit, the pressure of gas flowing out of the porous surface is least effective in forcing away the web.

Though the seal of this invention has generally been spoken of herein as being "between" a pair of chambers this is not to be construed as representing any fixed design. Accordingly, the seal can be located more within one chamber than the other or even be entirely situated within one of the chambers as long as the web enters the seal in one chamber and emerges from the seal in the other.

In preferred embodiments of the invention, the narrow slot through which the travelling web must pass should be adjustable so as to provide the desired clearance from the web by movement of either or both halves of the seal, either away from or toward each other. Precise adjustments as fine as to 0.001 inch are desirable. Also, it may be desirable to provide means for opening the slot to permit passage of splices in the web or to permit thread-up of a new web. In such an embodiment, there should be provided closure means (such as member 31 in FIGURE 2) which are expandable. For example, the closure means may contain an elastic material such as rubber, they may be flexible (e.g., corrugated), or they may utilize sliding members in which case it might be desirable to employ a low-friction material such as polytetrafluoroethylene. In the case of a non-porous rotating roll, sealing at the ends of the roll can be affected by means of conventional rotating mechanical seals. The specific form of such modifications would be readily apparent to one skilled in the art.

This invention is broadly concerned with all processes involving the movement of a continuous web from a chamber maintained at one condition to a chamber maintained at a different condition. The conditions which differ in the two chambers may take the form of gas pressures, both of which may be below atmospheric pressure or above atmospheric pressure. Also one chamber might be maintained at atmospheric pressure while the other is at either a lower or a higher pressure. One chamber might be illuminated while the other is in darkness. Differences in other conditions might also be maintained, e.g., differences in temperature, relative humidity, chemical composition within the chambers, etc. Thus, the device might be useful in heating, cooling, drying or moistening a moving web. Applications of layers of various materials to the web by such means as dip, roll, spray or extrusion coating or vapor condensation are conveniently carried out in chambers which can be isolated by the seal of this invention. Also, it might be desirable to pass a web through a chamber containing a toxic atmosphere (e.g., vapors of an organic solvent, radioactive particles, etc.) and to utilize the seal of this invention to prevent contamination of the surrounding air.

The seal described herein finds particular utility in isolating a web coating chamber from an adjacent area maintained at a different condition through which the web must pass, e.g., a drying chamber. It might also be desirable to use this invention so that the drying area may be separated into two or more adjacent chambers maintained at different conditions, e.g., each chamber might be maintained at a different relative humidity so as to effect some prescribed pattern of drying conditions. In another application, the web might be treated so as to alter its surface properties by passing through a chamber in which a chemical agent, e.g., an acid or a base in the form of a spray, mist or liquid bath, can act upon the web but be restrained from leaving the chamber.

The open atmosphere may be considered as one of the two "chambers" which are separated by the sealing device of the invention. Thus, a web may travel from an area open to the atmosphere, through the seal, and into a closed chamber wherein there is maintained some condition differing from that of the outside atmosphere. More than one of these seals may be useful in a web handling apparatus. For example, a web could travel from open atmosphere, through a seal, into a closed chamber, and out through a second seal into the open atmosphere. Such a system of multiple seal would have particular utility when carrying out a continuous process which requires the use of an extremely long web. Since webs are normally handled as rolls of finite length, e.g., a few thousand feet, it is necessary in a continuous web handling process to make splices from one roll to another at unwind and rewind stations. These stations are preferably located outside of the processing chamber(s) and are conveniently separated therefrom by one or more of the seals of this invention.

Any gas may be forced through the porous surface with air of course being the cheapest and most readily available. In certain instances it is desirable to employ, for this purpose, the same gas being maintained in one of the chambers sealed by the device of this invention. The gas itself may be used to heat, cool or otherwise treat a moving web. It might be desirable, particularly in using condensable gases, to heat the porous member, e.g., by an electric current. Condensable as well as non-condensable gases may be useful.

The web which travels through the seal may be of any desired material, e.g., film base, paper, metal foil, etc. By the term "web" is meant any essentially continuous material having a width considerably greater than its thickness. Web, tape, film, pellicle and ribbon are considered essentially synonymous terms.

The porous elements which form part of the seal may be fabricated from porous metal (e.g., bronze, stainless steel), plastics, (e.g., polytetrafluoroethylene, monochlorofluoroethylene polymer, etc.), carbon, glass, silica, alumina, etc. Conveniently, small beads of a thermoplastic polymer may be sintered to form the porous material. Alternatively, a porous material may be prepared by calendering multilayers of wire screening. Naturally occurring materials such as certain stones, sponges, etc. can be used as the porous element, as well as fabricated materials such as synthetic sponge. A certain degree of structural strength is desirable in the porous element but great strength is not necessarily a requirement.

The size of the holes in the porous material and their spacing vary over a considerable range but the holes should roughly range in diameter from about 0.1 micron to 1000 microns with the spacing between the holes being approximately equal to or slightly greater than the diameter of the holes. A number of readily available porous materials suitable for this purpose have pores of average diameter ranging from about 0.25 to 220 microns. The hole size and spacing between the holes should be such as to prevent the web from contacting any of the solid surface of the plate between the holes. The chances for such contact are obviously decreased as the number of holes per unit area is increased. Also, the chances for contact are decreased as the pressure of the gas flowing through the porous plate is increased. The desired pressure in the plenum chambers will naturally vary with such factors as the length and thickness of the porous material, the desired rate of flow of the gas, the web clearance, the average diameter of the holes, the number of holes per unit area and with the pressures it is desired to maintain in the two chambers. Obviously, the pressures in the plenum chambers must be greater than the pressures in either chamber separated by the seal. This will assure uniform flow of gas through the entire sealing area of the porous surface and thus avoid physical contact between the moving web and the porous surfaces. Higher pressures might be required except for a particular advantage which this system enjoys, viz., any force tending to push the web toward the porous plate will be met by an opposing force caused by the pressure of the gas flowing through the porous plate. This opposing force, it has been observed, becomes greater as the web moves closer toward the porous plate, approaching as a maximum the force derived from the full pressure in the plenum chamber.

In a specific apparatus for a continuous process of vacuum extrusion coating of webs wherein coating and drying occur in a common chamber, the sealing device of the present invention has been found to be particularly useful in making it possible to separate the coating area from the drying area so as to maintain a pressure differential between the two. More specifically, it was found to be advantageous to maintain the coating chamber at a higher pressure than the drying chamber. Specifically, the apparatus shown in FIGURE 1 was employed in effecting a separation into distinct coating and drying chambers 12 and 13, respectively. The seal consisted of two plates of porous metal 15 and 16, made from sintered bronze having a porosity of about 30%. The size of the pores generally ranged from about 2 to 5 microns. The two plates, each having a length of 30 cm., a width of 38 cm. and a thickness of 1.25 cm., were spaced apart by a distance of about 0.114 cm. In the coating chamber 12, the total gas pressure was maintained at 45–50 mm. of mercury absolute, while on the other side of the seal (the drying chamber 13) the total gas pressure was maintained at only 15–20 mm. of mercury absolute. Air from a common source at 650 mm. of mercury absolute, flowed through supply tubes 17 and 18 to the two plenum chambers 19 and 20 and thence through the porous members 15 and 16 of the sealing means at an average flow rate of about 17 lb. per hour per square foot. Because of the effect of gravity, there was a tendency for the web 11 to form a catenary as it passed through the seal and thereby to contact the surface of the lower porous plate. This tendency was overcome by restricting the gas pressure supply leading to the upper plenum chamber. Thus, a majority of the air was diverted so as to flow through the lower of the two porous plates and thereby to prevent physical contact with the web. It should be noted that this unequal apportionment of air flow was necessitated because the web passed through the seal in a horizontal direction. If the web had been travelling in a vertical direction, there would have been no need to compensate for gravitational forces. A web of cellulose triacetate photographic film base, 0.14 millimeter in thickness, with a gelatin subcoating, was coated in chamber 12 (by means not shown) at 110° F. to a coating weight of 38 milligrams of silver per square decimeter with a light-sensitive gelatino silver-halide emulsion of the cine positive type. After being coated, the web travelled from the coating chamber 12, through the web seal, and into the drying chamber 13, at a speed of 235 f.p.m. The dried film was of excellent quality and completely free of the abrasion marks which would have resulted if there had been any contact between the wet coating and the sealing member. The pressure of 45–50 mm. of mercury was selected as approximately optimum for the coating operation and without the device of the present invention, it would have been customary to dry at this same pressure. However, by using the seal described herein, it was also possible to select a preferred drying pressure, independent of the coating pressure. For example, by drying at a lower pressure, it was possible to achieve more rapid drying. Of greater importance, it was possible to achieve an adequate drying rate while maintaining the film temperature at a lower temperature (65–75° F.) than would have been possible if it had been necessary to maintain the pressure in the drying chamber at the higher pressure of the coating chamber. The reduced drying temperature lowered the static susceptibility of the film and eliminated the haze which would have been observable on photographically processed film manufactured under similar conditions except for drying at a higher temperature.

The obvious advantage already mentioned is that a seal can be obtained for a moving web without any physical contact between the web and apparatus. For a high quality product, particularly one which is relatively susceptible to physical damage, such as photographic film, this feature is extremely important. For liquid coating processes this invention allows separating the coating chamber from the area in which the web is to be dried and thus permits the web to leave this coating chamber without disturbing the wet coated layers. Furthermore, the porous plates or porous curved surfaces permit very close spacing so that a large pressure differential between the two chambers can be obtained with relatively low gas flow rates, thus avoiding expensive installations such as high capacity vacuum pumps. Also, a low gas flow rate is beneficial as it helps to maintain constant conditions (e.g., pressure, chemical, humidity, composition, etc.) within the processing chamber. In other words, control of a given ambient atmosphere is facilitated as the gas flow rate is reduced to lower and lower levels.

Another advantage of the invention is that the gas flowing through the porous plates acts as a lubricant, enabling the moving web to pass through the seal very smoothly and with a minimum of drag. Furthermore, this seal contributes to improved cleanliness of the apparatus and of the web itself, as compared with other types of seals. The gas pressure tends to exclude dirt from passing through the seal as well as preventing interchange of fluids across the seal. Furthermore, the material of the porous element acts as a fine filtration media for the gas itself which prevents contamination from that source. The apparatus is relatively simple and could be designed with no moving parts, so that fabrication cost need not be high and operations should be trouble-free. Other advantages will be apparent to those skilled in the art of handling moving webs.

What is claimed is:

1. In an apparatus comprising a pair of chambers to be maintained under different environments with a continuous web moving therebetween, a device for producing a seal between said chambers comprising a pair of closely-spaced members located on either side of said web, at least one of said members being porous, and means for forcing a gas through said porous member under sufficient pressure to prevent physical contact of said web with the side of said seal containing said porous member.

2. An apparatus as defined in claim 1 wherein both of said members are flat, porous surfaces.

3. An apparatus as defined in claim 1 wherein said members are mated arcuate, porous members.

4. An apparatus as defined in claim 3 wherein one of said porous members is cylindrical and the other porous member is arcuate and concentric therewith.

5. An apparatus comprising a pair of contiguous chambers separated by a common wall, said chambers to be maintained under different environments, a continuous web passing through an opening in said wall, a pair of closely-spaced porous members connected to said wall located on either side of said web within said opening, means for forcing a gas through said porous members under sufficient pressure to prevent physical contact of said web with said porous members thereby effectively producing a seal between said chambers.

6. An apparatus for treating a continuously passing photographic film which comprises in combination two chambers, said chambers to be maintained under different environments and at least one of which is enclosed; an air seal connecting said chambers and having a pair of closely-spaced members, at least one of which is porous, said members being spaced to allow passage of said film from one chamber to the other between said members; and means for forcing a gas through said porous member of said air seal under sufficient pressure to prevent physical contact of said film with the side of said seal containing said porous member.

References Cited by the Examiner

UNITED STATES PATENTS 2,963,268   12/1960   Smile et al. _____ 277—3
3,027,821   4/1962   Wright _____ 95—89
3,061,940   11/1962   Cichelli _____ 34—156

NORTON ANSHER, *Primary Examiner.*

S. ROTHBERG, EVON C. BLUNK, *Examiners.*